United States Patent
Davy et al.

(10) Patent No.: US 8,714,297 B2
(45) Date of Patent: *May 6, 2014

(54) SINGLE WHEEL SUSPENSION OF A NON-STEERABLE DRIVEN WHEEL OF A TWO TRACK VEHICLE

(71) Applicant: Bayerische Motoren Werke Aktiengesellschaft, Munich (DE)

(72) Inventors: Elsa Davy, Munich (DE); Bernhard Paulus, Munich (DE); Alfred Pruckner, Munich (DE); Dirk Schlichte, Munich (DE); Jakob Mueller, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 13/801,006

(22) Filed: Mar. 13, 2013

(65) Prior Publication Data
US 2013/0228994 A1  Sep. 5, 2013

Related U.S. Application Data

(63) Continuation of application No. PCT/EP2011/063192, filed on Aug. 1, 2011.

(30) Foreign Application Priority Data

Sep. 14, 2010  (DE) .......................... 10 2010 040 763

(51) Int. Cl.
*B60K 17/12* (2006.01)
*B60G 3/20* (2006.01)

(52) U.S. Cl.
USPC ............... 180/385; 180/65.6; 280/124.116; 280/124.128; 280/124.132; 280/124.153

(58) Field of Classification Search
CPC ............ B60G 3/20; B60G 3/22; B60G 3/207; B60G 2204/422
USPC ............. 180/65.51, 65.6, 337, 344, 348, 363, 180/373, 383, 384, 385; 280/124.116, 280/124.128, 124.132, 124.153; 301/6.5

See application file for complete search history.

(56) References Cited

U.S. PATENT DOCUMENTS 2,182,417 A * 12/1939 Waller .......................... 180/363
2,208,710 A    7/1940 Tjaarda
(Continued)

FOREIGN PATENT DOCUMENTS

DE    10 2007 020 209 A1    10/2008
DE    10 2008 001 791 A1    12/2009
(Continued)

OTHER PUBLICATIONS

Machine Translation of DE102009038424 A1, printed on Aug. 14, 2013.*

(Continued)

*Primary Examiner* — Ruth Ilan
(74) *Attorney, Agent, or Firm* — Crowell & Moring LLP

(57) ABSTRACT

A single-wheel suspension of a non-steerable driven wheel of a two-track vehicle is provided. The suspension includes two longitudinal control arms that pivot in a vertical plane. The first control arm is supported by a vertical pendulum support and supports a wheel bearing. The second control arm is supported with one rotational degree of freedom on the vehicle and is connected to the first control arm with one rotation degree of freedom by a connecting member between the wheel bearing and the pendulum support. At least a section of the first control arm between the wheel bearing and the connecting member is located inside the wheel rim space. A gear mechanism at least partially inside the wheel rim includes two transmission stages laterally offset from one another. The rotational axes of a connection shaft connecting first and second transmission stages and the connection element between the two control arms coincide.

10 Claims, 5 Drawing Sheets

(56) References Cited

U.S. PATENT DOCUMENTS

| | | | |
|---|---|---|---|
| 7,537,071 B2 * | 5/2009 | Kamiya | 180/65.51 |
| 8,382,131 B2 | 2/2013 | Davy et al. | |
| 2006/0283653 A1 | 12/2006 | Buschena | |
| 2011/0062769 A1 * | 3/2011 | Haeusler | 301/6.5 |

FOREIGN PATENT DOCUMENTS

| | | |
|---|---|---|
| DE | 10 2009 038 424 A1 | 2/2011 |
| EP | 1 457 378 A2 | 9/2004 |
| FR | 846 448 A | 9/1939 |
| WO | WO 2011/072967 A1 | 6/2011 |

OTHER PUBLICATIONS

International Search Report dated Oct. 17, 2011 w/ English translation (six (6) pages).

German Search Report dated Jul. 25, 2011 w/ partial English translation (ten (10) pages).

* cited by examiner

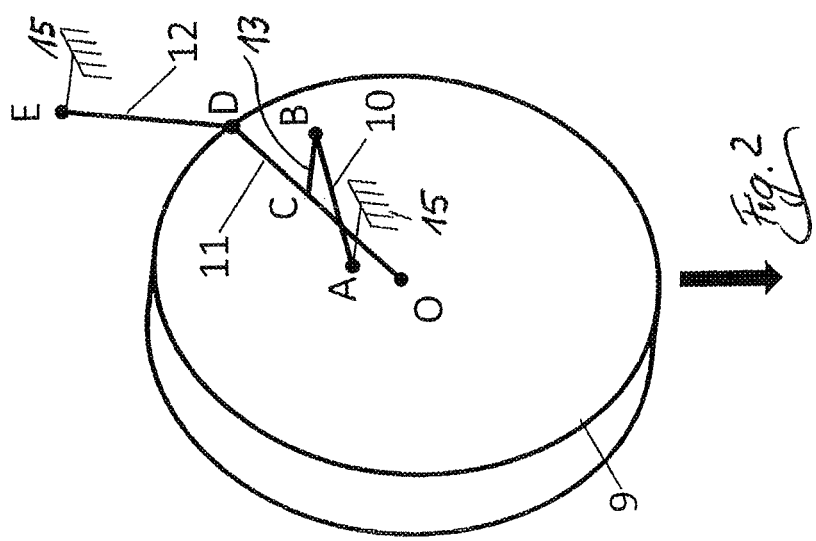
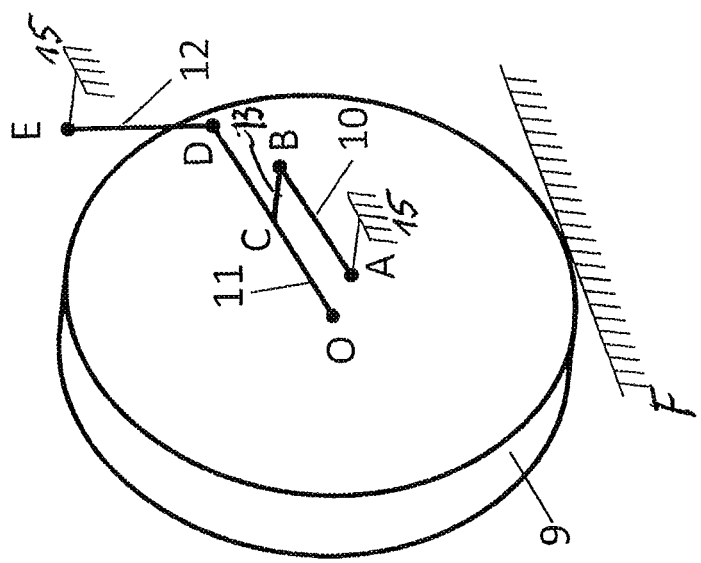
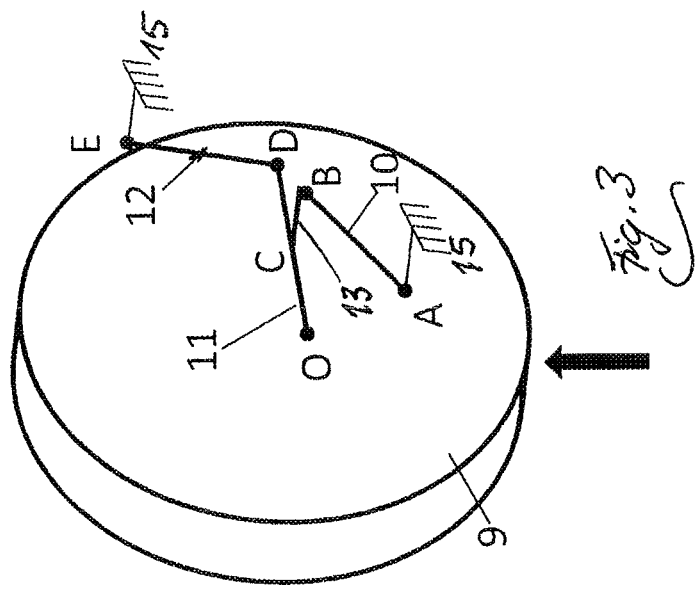

SINGLE WHEEL SUSPENSION OF A NON-STEERABLE DRIVEN WHEEL OF A TWO TRACK VEHICLE

CROSS REFERENCE TO RELATED APPLICATIONS

This application is a continuation of PCT International Application No. PCT/EP2011/063192, filed Aug. 1, 2011, which claims priority under 35 U.S.C. §119 from German Patent Application No. 10 2010 040 763.1, filed Sep. 14, 2010, the entire disclosures of which are herein expressly incorporated by reference.

BACKGROUND AND SUMMARY OF THE INVENTION

The invention relates to a single wheel suspension that is configured for a non-steerable driven wheel of a two track vehicle. The invention comprises two control arms, which extend, when viewed in a vertical projection, essentially in the longitudinal direction of the vehicle from a kinematic perspective and which can be pivoted in each case in an essentially vertical plane due to their mounting, wherein a wheel bearing, which carries the wheel, is fastened directly or indirectly to the first control arm; and the first control arm is supported with its end section on the vehicle body by way of a pendulum support, which extends at least approximately in the vertical direction in the as-designed position, or by way of an A-arm having a broadened base, and wherein the second control arm is supported, on the one hand, in an articulated manner directly or indirectly on the vehicle body with only one kinematic rotational degree of freedom and, on the other hand, is connected in an articulated manner to the first control arm between the wheel bearing and the attachment point of the pendulum support with only one kinematic rotational degree of freedom by a connecting element, representing a pivot axis, and wherein the first control arm is located with at least its section which extends from the wheel bearing to the connecting element with the second control arm, inside the space which is enclosed or described by a rim of the wheel. The wheel can be driven by a drive shaft and a gear mechanism which adjoins said drive shaft and is arranged at least partially inside the space enclosed or described by the rim of the wheel and which comprises at least two transmission stages, which are offset from each other in the axial direction of the wheel and formed by gear wheels.

Such a single wheel suspension is a combination of the subject matter disclosed in the international patent application, bearing the filing number PCT/EP2010/067478, which is not a prior publication, and the German patent application, bearing the official filing number DE102009038424.3, which also is not a prior publication. The entire content of the disclosure of each of the two patent applications is hereby explicitly incorporated in the present patent application by reference. However, in addition, it must be clarified how the concept that is used in the present patent application, i.e. the control arms extend essentially in the longitudinal direction of the vehicle from a kinematic perspective and can be pivoted in an essentially vertical plane, is to be construed. A control arm of the single wheel suspension according to the invention does not necessarily have to have the shape of the conventional wheel-guiding control arms of wheel suspensions, but can still act, nevertheless, when viewed kinematically, as a control arm and can exhibit the defined potential movements. In any event a "straight line approximation" can be defined for such a control arm in a kinematic model. Then such a control arm has the described property, i.e. extends essentially in the longitudinal direction of the vehicle and can be pivoted in an essentially vertical plane. In this case the concept "essentially" can be treated as equivalent to the fact that the control arms or more specifically their "straight line approximation" in a kinematic model are inclined by not more than an angle in an order of magnitude of 6° to 10° relative to the longitudinal direction of the vehicle and that said control arms can be pivoted in a plane, which is inclined by not more than an angle in an order of magnitude from 6° to 10° relative to the vertical plane, due to their mounting. Furthermore, it must also be pointed out that the concept "in the as-designed position" denotes, as known to the person skilled in the art, the position of the wheel relative to the vehicle body for a maximally loaded vehicle when the vehicle is standing still.

Based on the aforesaid, the object is to provide an especially space-saving arrangement for such a single wheel suspension (=object of the present invention).

The solution to this problem lies in a single wheel suspension that is characterized in that the axis of rotation of a connecting shaft, which connects the second gear wheel (when view from the direction of the drive shaft) of the first transmission stage to the first gear wheel of the second transmission stage, coincides with the pivot axis, representing the connecting element of the two control arms. Advantageous embodiments and further developments are the content of the dependent claims.

The aforementioned characterizing features require very little installation space, because the said connecting shaft and the said connecting element can be arranged concentrically to each other due to the rotational axis of the connecting shaft being coincident with the pivot axis of the connecting element. That is, the connecting shaft can be configured, for example, as a hollow shaft having an interior, in which the connecting element runs. It goes without saying that the reverse arrangement is also possible. For example, it is also possible in the sense of an advantageous further development that the connecting element itself can form the connecting shaft in that the two control arms of the single wheel suspension can be pivoted about the axis of rotation or more specifically about the said pivot axis by suitable bearings and, hence, can be securely mounted on the connecting element or more specifically on the connecting shaft in the axial direction.

In applying the same principle, the axis of rotation of the said drive shaft can also coincide with the pivot axis of the second control arm, in which this second control arm is supported in an articulated manner on the vehicle body with only one kinematic rotational degree of freedom, so that the result is an additional saving of needed installation space. In particular, however, this feature permits the output shaft of a motor, in particular an electric motor, to be used more or less directly as a drive shaft without the interpositioning of a cardan element. In this case this motor can be fastened in an advantageous way on the body of the vehicle and, as a result, does not belong to the so-called unsprung mass. Even in the case that the rotational axis of the said drive shaft coincides with the pivot axis of the second control arm relative to the body of the vehicle, it is possible, in principle, that the corresponding respective control arm can be rotatably mounted on a shaft comprising one of these axes of rotation, just as in the case that the pivot axis of one of the two control arms coincides with an axis of rotation of the gear mechanism or with an axis of rotation of a transmission stage of said gear mechanism. At a minimum, however, the said shaft can extend concentrically to and inside a hollow structure or a hollow component, on which in turn the control arm is mounted, as required.

The first control arm that carries the wheel bearing is located with at least its section which extends from the wheel bearing to the connecting element with the second control arm, inside the space which is enclosed or described by a rim of the wheel. At variance with the said German patent application DE102009038424.3, the gear mechanism is arranged (only) at least partially inside the wheel. In this case the expression "inside the wheel" should be treated as equivalent to the space, i.e. the so-called cavity of the wheel, which is enclosed or described or more specifically limited by the rim of the wheel. This cavity of the wheel or the rim is defined, when viewed in a projection perpendicular to the pivot axis of the wheel, by the inside wall, which faces the pivot axis and is associated with the rim well, which extends in essence parallel to the pivot axis of the wheel, as well as by the so-called wheel disk, which is typically located in the region of the wheel exterior that faces away from the body of the vehicle, and the other edge plane of the rim that faces the body of the vehicle and that stands, just like the wheel disk, perpendicular on the pivot axis of the wheel. Therefore, when viewed in both a projection perpendicular to the pivot axis of the wheel and also in a lateral projection in the direction of the pivot axis of the wheel, the first control arm is located with at least its said section, which extends from the wheel bearing as far as to the connecting element with the second control arm, inside the said cavity; this also applies to at least one part of the gear mechanism. The result is a space-saving arrangement, wherein the first control arm can project with that section to which the said pendulum support or the said A-arm with a broadened base is joined, beyond the space which is enclosed or described by the rim, because this pendulum support or the said A-arm is located at least partially outside the space that is enclosed or described by the wheel rim, so that said pendulum support or said A-arm can be supported in turn on the body of the vehicle. If, as stated above, the first control arm projects with its section which is joined to the pendulum support or the like beyond the space that is enclosed or described by the wheel rim, this control arm cannot extend completely more or less in the longitudinal direction of the vehicle as a concrete component. For this reason the corresponding orientation of this control arm is recited in the claims only from a kinematic perspective. Furthermore, this first control arm is configured in a manner similar to a wheel carrier in the said international patent application PCT/EP2010/067478, which shows one possible concrete rendering of a single wheel suspension according to the present invention; however, in contrast this first control arm does, in fact, extend with its section which extends from the wheel bearing to the connecting element with the second control arm, essentially in the longitudinal direction of the vehicle when viewed from a kinematic perspective.

The installation space requirement of a single wheel suspension according to the invention can be reduced even more, if, in addition to the first control arm, which is located in sections inside the wheel rim, the second control arm is also located in essence inside the space which is enclosed or described or more specifically limited by the wheel rim, at least in the as-designed position and at least in a projection in the direction of the pivot axis of the wheel and/or the gear mechanism with its two transmission stages. On the side of the wheel that faces the body of the vehicle, this type of single wheel suspension does not need any additional installation space, with the exception of the said pendulum support or the said A-arm with a broad support base, which extends essentially in the transverse direction of the vehicle, as well as with the exception of the associated section of the first control arm and the support of the pendulum support or the said A-arm on the body of the vehicle as well as with the exception of the drive shaft that extends to the gear mechanism, so that the chassis or rather the body of the vehicle has ample installation space on the inside of the wheel that faces the body of the vehicle.

The aforementioned international application PCT/EP2010/067478 discloses that the pivot axis of the articulated connection between the first control arm and the second control arm can be slightly inclined relative to the horizontal plane (when viewed in the longitudinal direction of the vehicle) and/or relative to the transverse direction of the vehicle (when viewed in a vertical projection) in the as-designed position. The same applies to a single wheel suspension according to the present invention, because, in this case, too, this said measure makes it possible to achieve a desired change in the wheel camber angle and/or the wheel toe-in angle in connection with a vertical compression movement or decompression movement of the wheel. At least in the case of a substantial inclination of said pivot axis or rather the corresponding connecting element, the said gear mechanism comprising the said connecting shaft that coincides with this pivot axis should be adapted as required and, thus, consequently exhibits bevel gears, i.e. gears with an engagement surface in the shape of a cone, in this region. In the case of a preferred embodiment of the gear wheels as toothed gears, at least the first gear wheel of the second transmission stage, optionally also the second gear wheel, which is arranged on the same connecting shaft and is assigned to the first transmission stage, is designed as a bevel gear. It goes without saying that additionally it is also possible to design the additional gear wheels of the said gear mechanism as bevel gears. Furthermore, the second gear wheel of the second transmission stage can be designed preferably as a gear wheel with internal teeth, since a high transmission ratio in these two transmission stages can be achieved in a design that is optimized with respect to the installation space.

According to an advantageous further development of the present invention, at least one of the control arms is designed at least in sections in the manner of a housing, inside which the two gear wheels of a transmission stage are arranged. For the control arm this quasi box-like design provides high strength and minimizes the required installation space, because the gear wheels are arranged in the cavity of such a control arm, which is designed, for example, in the manner of a box; and the said housing protects the gear wheels from getting dirty and against the loss of lubricant into the surrounding area.

Other objects, advantages and novel features of the present invention will become apparent from the following detailed description of one or more preferred embodiments when considered in conjunction with the accompanying drawings.

BRIEF DESCRIPTION OF THE DRAWINGS

FIGS. 1 to 3 are schematic illustrations of the kinematic arrangements of an embodiment of the present invention showing various compression states of the wheel relative to the body of the vehicle.

DETAILED DESCRIPTION OF THE DRAWINGS

Figure 4:
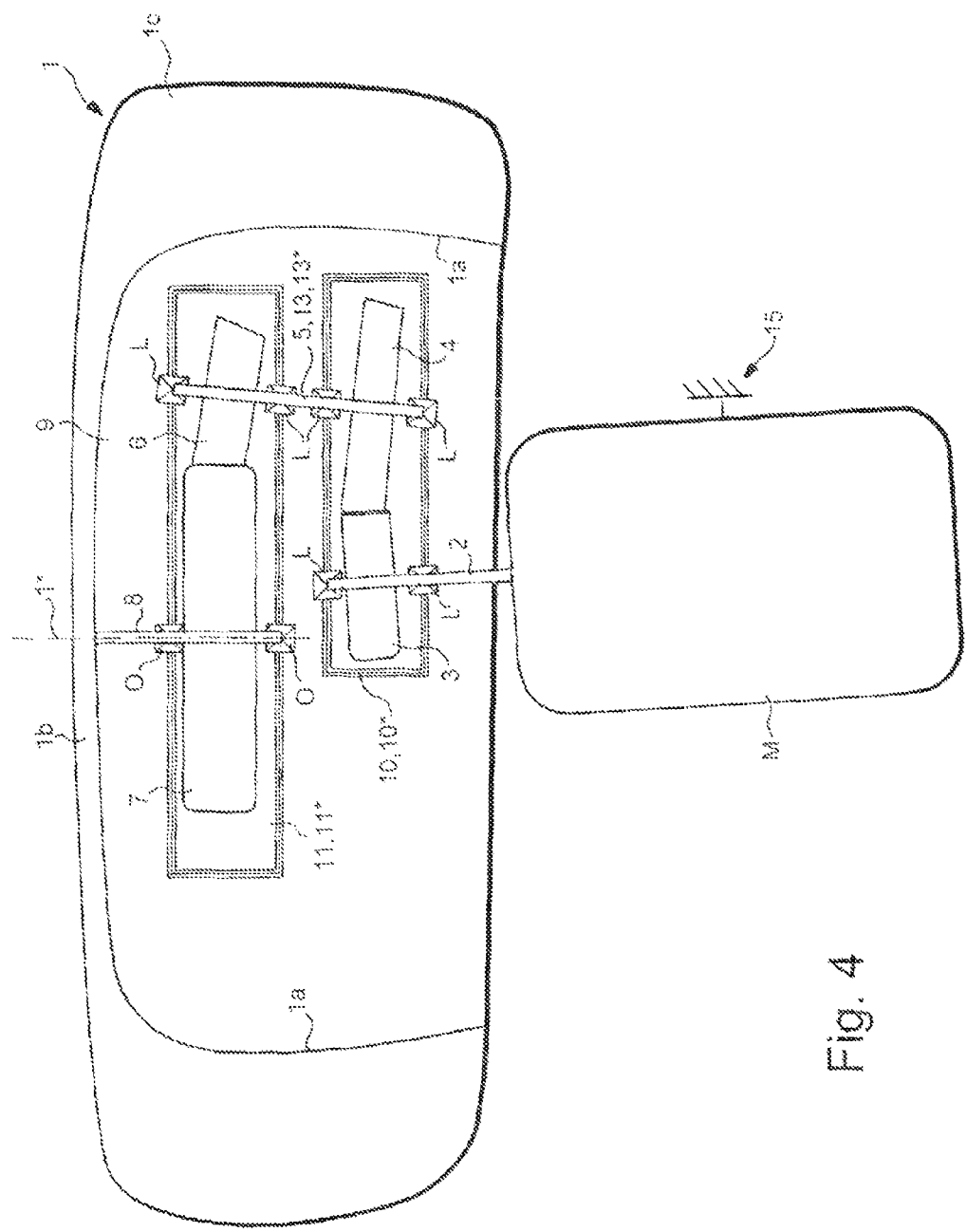
FIG. 4 is a schematic plan view of an embodiment of the present invention with a gear mechanism with a drive shaft and an output shaft.

FIG. 1 shows the control arms in an as-designed position of the wheel relative to the body of the vehicle (i.e., the static ride height), whereas in FIG. 2 the control arms are shown in a decompressed state of the wheel relative to the body of the vehicle; and in FIG. 3 the control arms are shown in a compressed state of the wheel relative to the body of the vehicle. The respective state is shown by the arrows and/or the lane F (which is shown in the conventional way) below the space enclosed by the wheel or rather the rim.

The reference numeral 9 marks the left rear (and non-steerable) wheel of a passenger vehicle, or more specifically the space, which is enclosed or described or more specifically limited by the rim of this wheel, as further explained in connection with FIG. 4, below. The wheel itself, which is not shown in FIGS. 1 to 3 and which envelops the said space 9 or rather the cavity 9, is mounted in the conventional way by way of a wheel bearing so as to be rotatable about the point O. Moreover, the letter "O" is also used below to identify the said wheel bearing.

The wheel bearing O is fastened directly or indirectly to an end section of a first control arm 11 of the wheel suspension. From a kinematic perspective this first control arm 11 extends, when viewed in a vertical projection (perpendicular to the lane F), essentially in the longitudinal direction of the vehicle. That is, this first control arm is inclined by not more than an angle in an order of magnitude of 6° to 10° relative to the longitudinal direction of the vehicle. Moreover, this first control arm 11 also extends in such a manner to be explained in detail below that this control arm 11 can be kinematically pivoted in an essentially vertical plane that is inclined by not more than an angle in an order of magnitude of 6° to 10°. The latter concept "kinematically pivotable" and the concept "kinematic rotational degree of freedom" are supposed to exclude, as stated above, the elastokinematic effects known to the person skilled in the art. This means that it is also possible for the movements of the (respective) control arm to deviate slightly, subject to the corresponding action of the forces, from the (respective) degree of freedom, even when suitable rubber bearings are provided. However, just slightly differing movements can take place only in a rubber bearing, which is assigned to the control arm, without the influence of correspondingly large forces and without elastic deformations.

In addition to the said first control arm 11, the wheel suspension according to the invention comprises a second control arm 10, which from a kinematic perspective is also guided, when viewed in a vertical projection (perpendicular to the lane F), essentially in the longitudinal direction of the vehicle (that is, in the direction of the longitudinal axis of the vehicle) and, thus, is inclined by not more than an angle in an order of magnitude of 6° to 10° relative to the longitudinal direction of the vehicle. For this purpose an end section or more specifically a region of the first end section of this second control arm 10 is supported on or is connected in an articulated manner to the vehicle body 15 (shown only in schematic form) at point A in such a way that this second control arm 10 can be pivoted about this point A with only one kinematic rotational degree of freedom. Therefore, this second control arm 10 can also be kinematically pivoted only in an essentially vertical plane that is inclined by not more than an angle in an order of magnitude of 6° to 10° relative to the vertical plane. Thus, this point A shows the position of the corresponding joint or bearing, by which the second control arm 10 is guided, as described above, in a pivotable manner relative to the vehicle body 15 (which is shown only in an abstract manner).

The other end section or more specifically the region of the second end section of the second control arm 10 is connected in an articulated manner to the first control arm 11 with only one kinematic rotational degree of freedom. In this case this articulated connection forms or describes a pivot axis 13\* that extends through the points B, C; and this articulated connection is formed by a connecting element 13. This connecting element 13 can be, for example, a connecting pin having the end points B, C. In this case the first control arm 11 and the second control arm 10 can be pivoted about this said connecting pin 13, which extends more or less horizontally in essentially the transverse direction of the vehicle owing to the described orientation and the freedom of movement of these two control arms 11, 10; and in particular, the first control arm and the second control can be pivoted about the said pivot axis 13\*. Thus, the point B shows the position of a corresponding joint or bearing, by which the second control arm 10 can be pivoted about the said pivot axis 13\*; and the point C shows the position of a corresponding joint or bearing, by which the first control arm 11 can be pivoted, as described above, about the said pivot axis 13\*.

Figure 5:
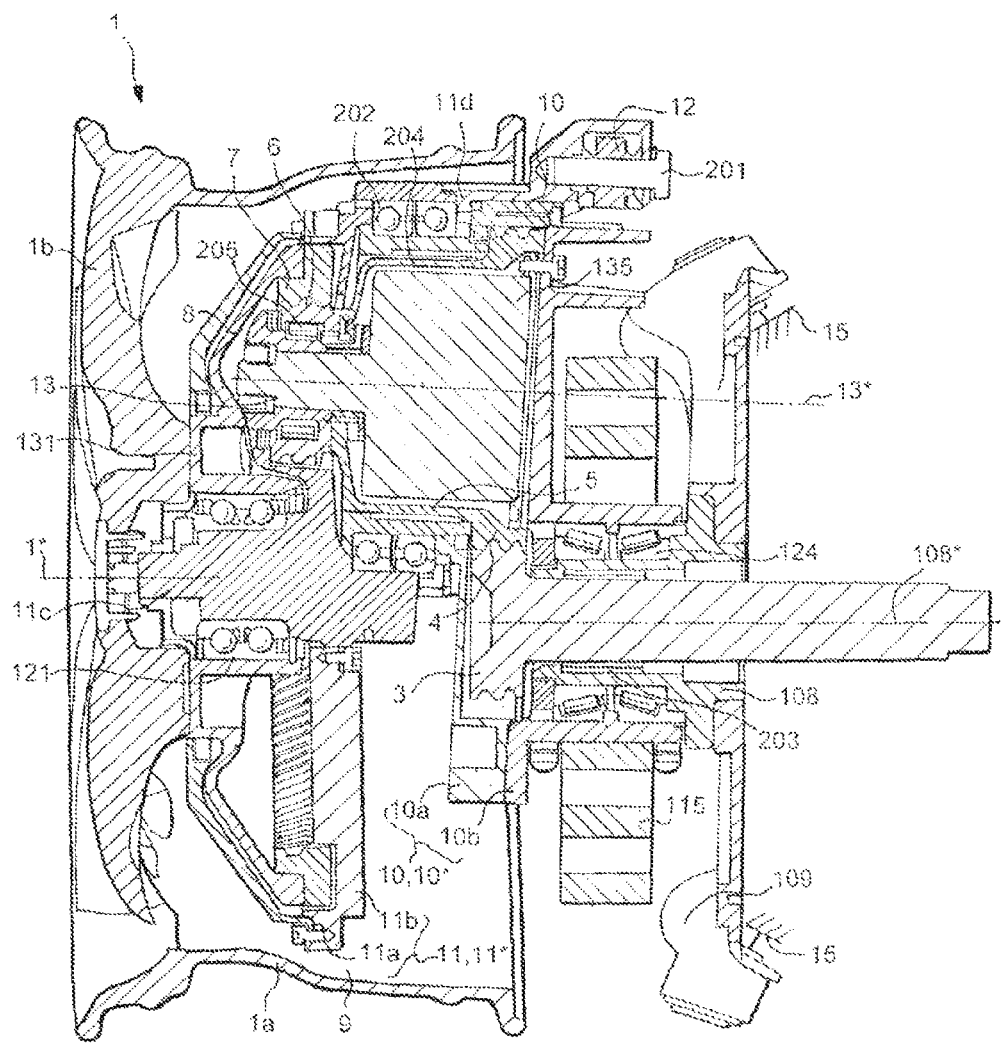
FIG. 5 is a cross-section view of an exemplary embodiment of the present invention including the pivot axis of the wheel, in which all of the cut structural elements identified by markings.
Figure 6:
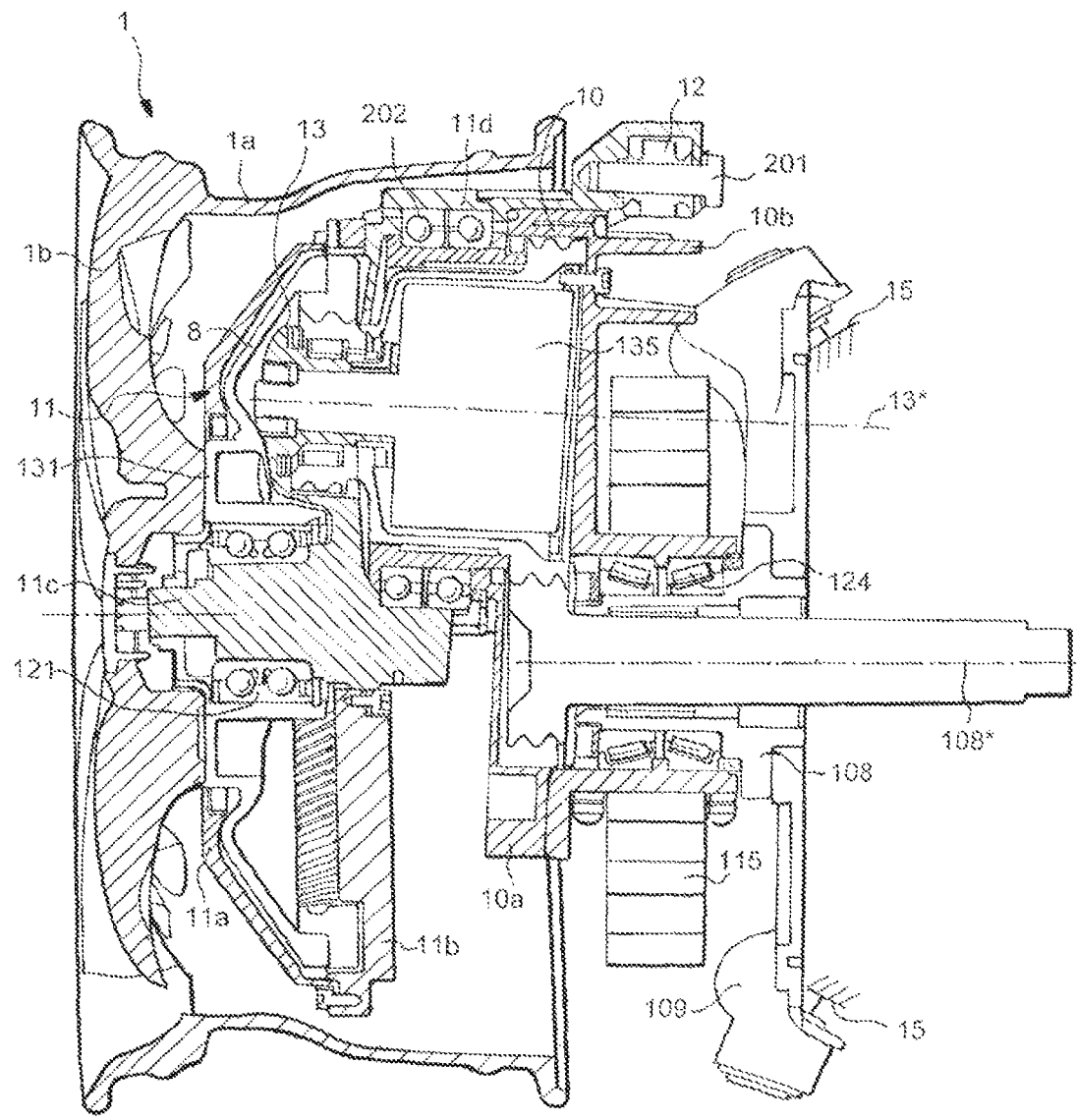
FIG. 6 shows the FIG. 5 embodiment with markings only the wheel, the two control arms which guide the wheel, and their connecting elements.
Figure 7:
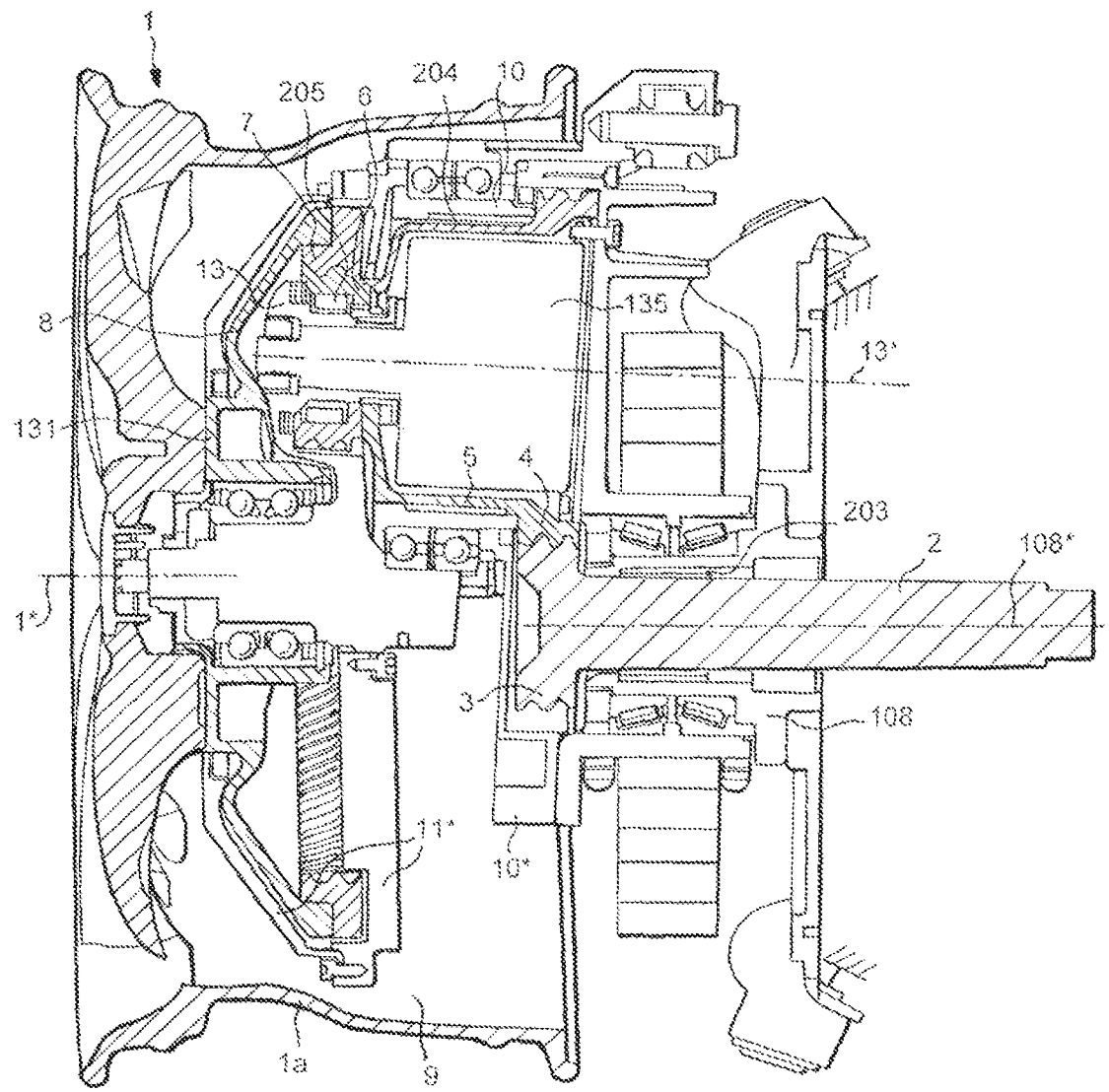
FIG. 7 shows the FIG. 5 embodiment with marking on only the wheel and elements of the said gear mechanism.

In the drawings from FIGS. 1 to 3, the latter articulated connection between the two control arms 11, 10 is located on the first control arm 11, when viewed in the longitudinal direction of the vehicle (in this case approximately in the middle of the control arm), but this connection can also be configured in some other place (see FIG. 4 which is explained below). In contrast, a key factor is that the first control arm 11 has an end section that is situated opposite the wheel bearing O and which is supported, viewed in the vertical direction, indirectly on the vehicle body 15. For this purpose a so-called pendulum support 12 is provided. This pendulum support 12, which extends at least approximately in the vertical direction in the as-designed position, is supported on the first control arm 11 at point D and on the vehicle body 15 at point E preferably by way of a joint, which restricts only one degree of freedom. This joint is configured, for example, in the form of a ball joint or a corresponding rubber joint or more specifically a rubber joint that lends itself well for such a support in an essentially vertical direction. In this case the points D, E show in each instance the position of such a joint. Thus, in theory the vehicle body 15 could project with a corresponding projection into the space 9, enclosed by the rim of the wheel, but in reality such a design does not lend itself as well. It would be better if the pendulum support 12 were located outside the said space 9 enclosed by the rim. However, such an arrangement would make it necessary for the first control arm 11 to be guided with its section to which the pendulum support 12 is joined, out of this space 9. Such a feature is quite feasible in terms of the design configuration, but is not shown in the schematic sketches in FIGS. 1 to 4 for the sake of simplicity. The exemplary embodiment, which is shown in FIGS. 5 to 7 and explained in detail below shows this latter feature.

The basic function of this single wheel suspension, which has been described up to this point and is depicted in the FIGS. 1 to 4, lies in the fact that the wheel is guided with only one single remaining degree of freedom by just the two control arms 11, 10 in interaction with the pendulum support 12. This single remaining degree of freedom permits, according to FIG. 3, a compression movement of the wheel relative to the vehicle body 15 or, according to FIG. 2, a decompression movement of the wheel relative to the vehicle body 15. At the same time the described and quasi scissors-like arrangement of the two control arms 11, enables a relatively large vertical movement of the point O, that is, movement of the center point of the wheel or the wheel bearing O, in the event of a simultaneous minimal or just small vertical movement of the point D. Owing to the approximately linear guide of point D by the pendulum support 12 (or another element that is provided in its place), an approximately linear guide of point O takes place in at least a larger surrounding area about the as-designed position of FIG. 1. From a kinematic perspective the two control arms 11, 10 extend, when viewed in a vertical projection, essentially in the longitudinal direction of the vehicle and can be pivoted in an essentially vertical plane owing to their mounting. At this point it must be repeated once again that the concept "essentially" can be treated as equivalent to the fact that the control arms or more specifically their "straight line approximation" in a kinematic model are inclined by not more than an angle in an order of magnitude of 6° to 10° relative to the longitudinal direction of the vehicle; and that said control arms can be pivoted in a plane, which is inclined by not more than an angle in an order of magnitude of 6° to 10° relative to the vertical plane, due to their mounting.

The special advantage of this single wheel suspension described above lies in its small installation space requirement, especially when viewed in the transverse direction of the vehicle. Since there is no need for a wheel-guiding control arm or rather there is no wheel-guiding control arm which extends in the transverse direction of the vehicle or, more specifically, when viewed in a vertical projection, is inclined by a significant angular amount relative to the longitudinal axis of the vehicle, the installation space between the two wheels of an axle that is configured for a two track vehicle and exhibits this wheel suspension is not limited by wheel-guiding control arms. For example, a passenger vehicle has ample space for a trunk compartment or for electric energy accumulators. This also holds true, in particular, because, in addition to the features described up to this point, the first control arm 11 and the second control arm 10 are located inside the space 9 which is enclosed or described or more specifically limited by a rim of the wheel. The wheel has, as customary, an air-filled tire, which is pulled in the conventional manner onto this said rim. This space 9 or cavity 9 of the wheel has already been defined in detail above, but will also become apparent from FIG. 4 that is explained below.

In this case the statement in the preceding paragraph that there is no control arm that extends in the transverse direction of the vehicle is to be understood to mean that the said connecting element 13, by which the two control arms 11, 10, which extend in essence in the longitudinal direction of the vehicle, are connected together in an articulated manner like a pair of scissors so that the control arms can be pivoted in essence about the transverse axis of the vehicle, is not a wheel-guiding control arm. However, if this connecting element 13 is also considered to be a control arm, then in the present inventive wheel suspension in which the two control arms 11, 10, which extend in essence in the longitudinal direction of the vehicle, are located inside the space 9 (=cavity 9) which is enclosed or described by the rim of the wheel, this connecting element 13 may also be found inside the said space 9 and, thus, does not need any additional valuable installation space at the side of the wheel. In addition to the above explanations, it must be pointed out that an inventive wheel suspension with a small installation space requirement is produced, even if only the first control arm 11 that carries the wheel bearing O is located inside the wheel or more specifically in the said space 9 which is limited or described by the wheel rim, whereas the second control arm 10 can be located laterally at least partially or also completely outside this space 9. However, it is also advantageous if the second control arm 10 is located inside the space 9 limited by the wheel rim, when viewed in a projection in the transverse direction of the vehicle, that is, when viewed in the direction of the pivot axis of the wheel.

At this point referring to FIG. 4, the corresponding wheel 1 of the vehicle or more specifically the passenger vehicle, i.e. the wheel referred to in conjunction with FIGS. 1 to 3, is depicted in a horizontal sectional view in a highly simplified fashion. The wheel 1 has a rim 1$a$; a wheel disk 1$b$, which carries this rim; and a tire 1$c$, which is pulled onto the rim 1$a$. In the present projection perpendicular to the pivot axis 1* of the wheel 1, a space 9 or a cavity 9 of the rim 1$a$ is enclosed or described by means of the inside wall, which faces the pivot axis 1* and is associated with the rim well of the wheel rim 1$a$, which extends in essence parallel to the pivot axis 1* of the wheel, as well as by the wheel disk 1$b$, which is located in the region of the exterior of the wheel 1 that faces away from the body of the vehicle, and the other edge plane of the wheel rim 1$a$ that faces the vehicle body 15 and that stands, just like the wheel disk 1$b$, perpendicular on the pivot axis 1* of the wheel. In the structural arrangement the interior of this space 9 that is enclosed or described by the wheel rim 1$a$ has a gear mechanism (3-4-5-6-7). This gear mechanism (3-4-5-6-7) has a first transmission stage (3-4), which is arranged in a first housing 10* of the gear mechanism and a second transmission stage (6-7), which is arranged in a second housing 11* of the gear mechanism. In this case each transmission stage is formed by two gear wheels 3, 4 or 6, 7 respectively in the form of gear wheels that mesh with one another.

The gear mechanism (3-4-5-6-7) is driven by an electric motor M, which is laterally offset relative to the wheel 1 and is, thus, arranged outside the space 9 that is enclosed or described by the wheel rim 1$a$. The electric motor M is securely connected preferably to the chassis of the vehicle, i.e. connected to the body 15 of the vehicle, so that said electric motor is not involved in the compression movements and the decompression movements of the wheel 1 relative to the chassis of the vehicle or more specifically relative to the body 15 of the vehicle. Mounted on the motor shaft 2 or more specifically the drive shaft 2 of the electric motor M is a first gear wheel 3 of the first transmission stage (3-4) in the form of a drive pinion, which meshes with a second gear wheel 4 of the first transmission stage (3-4), this second gear wheel being arranged on a connecting shaft 5. The gear mechanism (3-4-5-6-7) has a second transmission stage (6-7); and this second transmission stage, which is laterally or more specifically axially outwards offset relative to the first transmission stage (3-4) in the direction of the pivot axis 1* of the wheel 1, has a first gear wheel 6, which is also arranged on or at the connecting shaft 5 and which meshes with a second gear wheel 7 of the second transmission stage (6-7) in the form of an output gear. This output gear or this second gear wheel 7 of the transmission stage (6-7) is arranged on an output shaft 8, which in turn is connected in a rotationally rigid manner to the wheel disk 1$b$, so that the output shaft 8 directly drives the wheel 1.

As stated above, the electric motor M is securely mounted with respect to the chassis 15 of a vehicle that is not illustrated in the present embodiment. In this case the wheel 1, which is guided by the control arms 11, 10 (explained in conjunction with FIGS. 1 to 3), can compress or decompress more or less in the vertical direction (and, thus, more or less perpendicular to the plane of the image in FIG. 4) with respect to the electric motor M and its drive shaft 2 based on the as-designed position. During a compression movement the transmission stages (3-4) and (6-7) or more specifically their gear housing 10*, 11* execute a "scissor movement" relative to each other, so that the first housing 10* of the gear mechanism is pivoted relative to the drive shaft 2; and the second housing 11* of the gear mechanism is pivoted relative to the output shaft 8. The two gear housings 10*, 11* are coupled together by the connecting shaft 5 and/or the aforementioned connecting element 13, which will be explained below.

As stated before the description of the drawings, the arrangement of the structural elements described up to this point is configured in such a way that the rotational axis of the connecting shaft 5, which connects the second gear wheel 4 of the first transmission stage (3-4) of the gear mechanism (3-4-5-6-7) to the first gear wheel 6 of the second transmission stage (6-7), coincides with the pivot axis 13*, represented by the connecting element 13 of the two control arms 10, 11. These control arms 10, 11, which guide the wheel 1 or more specifically the wheel bearing O, are also shown in a highly simplified fashion in FIG. 4. In this concrete exemplary embodiment both control arms 10, 11 are designed in each case in the form of a housing, inside which the two gear wheels of a transmission stage (3-4) or (6-7) respectively are arranged. In the present exemplary embodiment the first control arm 11 represents at the same time the gear housing 11* of the second transmission stage (6-7); and the second control arm 10 represents at the same time the gear housing 10* of the first transmission stage (3-4). However, this advantageous merging of the functions is not a mandatory feature of the present invention. Rather the essential feature is the coincidence (as described at the beginning of this paragraph) of the rotational axis of the connecting shaft 5 of the gear mechanism (3-4-5-6-7) with the pivot axis 13* of the connecting element 13 of the two control arms 11, 10. In this case it must be pointed out once again that, in particular, the first control arm 11 in a concrete embodiment of a single wheel suspension according to the invention (see in this respect the FIGS. 5 to 7, which are elucidated below, and the FIGS. 4 to 7 of the international application PCT/EP2010/067478, which has already been referred to multiple times), is designed in a different way than shown in FIG. 4; and, in particular, this first control arm projects beyond the space 9 with its section which is located opposite the wheel bearing O and to which the pendulum support 12 is joined according to FIGS. 1 to 3. It follows then that this first control arm 11 is not configured in the manner of a housing in its corresponding section that projects beyond the space 9.

In the present exemplary embodiment the connecting element 13 of the two control arms 11, 10 coincides with the connecting shaft 5 of the two transmission stages (3-4) and (6-7) of the gear mechanism (3-4-5-6-7), but this advantageous merging of the functions is not a mandatory feature of the present invention. In order to implement this advantageous merging of the functions, each of the control arms 11, 10 can be mounted on the connecting shaft 5 by suitable bearings L in such a way that said control arms can be pivoted slightly about this connecting shaft 5. In a comparable manner the second control arm 10 can be mounted on the drive shaft 2 by suitable bearings L in such a way that said control arm can be pivoted slightly about the drive shaft 2; and the first control arm 11 can be mounted on the output shaft 8 by suitable wheel bearings O in such a way that said control arm can be pivoted slightly about the output shaft 8. As a result, the wheel 1 is ultimately carried by the drive shaft 2 of the electric motor M (it goes without saying that this electric motor can also be replaced by a different drive unit); and, in so doing, is guided by the two control arms 11, 10 in the described manner. However, the support (also described in the present invention) of the wheel 1 relative to the body of the vehicle (by means of the electric motor M or rather, in general, a drive unit) is not a mandatory feature of the present invention; rather a different embodiment is shown in the FIGS. 5 to 7 to be explained below.

In the same way that the two wheel bearings O on the output shaft 8 in FIG. 4 form the wheel bearing O in FIGS. 1 to 3, the two bearings L on the drive shaft 2 from FIG. 4 form the point A in FIGS. 1 to 3. In the same way, the two bearings L between the connecting shaft 5 and the first control arm 11 form the point C in the FIGS. 1 to 3, whereas the two bearings L between the connecting shaft 5 and the second control arm 10 form the point B in the FIGS. 1 to 3. In the present embodiment two bearings L are shown in an abstract manner at each bearing point of one of the two control arms 11, 10, because each control arm forms a housing 11* or 10* respectively that is designed, for example, in the shape of a box. Consequently the two opposite outer walls of the respective "control arm housing" 11* or 10* respectively, by which the respective control arm 11 or 10 is mounted on one of the shafts, i.e. on the drive shaft 2 and/or on the connecting shaft 5 and/or on the output shaft 8, are mounted by a bearing L. However, in this case, too, different designs are possible. For example, the essential component of a control arm 10 or 11 respectively can be configured in the shape of a quasi basin and then can accommodate a transmission stage (3-4) or (6-7) respectively, whereas in order to form a gear housing 10* or 11* respectively in such a way that it is reasonably closed with respect to lubricating this transmission stage, this "basin" can be covered by a covering part, which is not mounted on the connecting shaft 5 or the connecting element 13.

As shown in FIG. 4 in a somewhat exaggerated fashion, the connecting shaft 5, which in this case forms simultaneously the connecting element 13 of the two control arms 11, 10, is not exactly aligned parallel to the pivot axis 1* of the wheel 1, where said pivot axis coincides with the rotational axis of the output shaft 8. Instead, the connecting element is slightly inclined relative to this pivot axis of the wheel. In this case this inclined position can be, as depicted, in a horizontal plane, comprising the rotational axis (=pivot axis 13*) of this connecting shaft 5, and/or in a vertical plane, comprising the rotational axis (=pivot axis 13*) of this connecting shaft 5. In the former case, the pivot axis 13* and the rotational axis of the connecting shaft 5 are slightly inclined, when viewed in a vertical projection, relative to the transverse direction of the vehicle, whereas in the latter case the pivot axis 13* and the rotational axis of the connecting shaft 5 are inclined, when viewed in the longitudinal direction of the vehicle, relative to the horizontal plane.

In this case a combination of these two directions of inclination is also explicitly possible.

Since the rotational axis of the slightly inclined connecting shaft 5 according to the invention is simultaneously the pivot axis 13* of the connecting element 13 of the two control arms 11, 10, a slight inclination of this pivot axis 13* of the control arm (or a light inclination of the corresponding connecting element 13) makes it possible to produce the desired changes in the wheel camber or the wheel toe-in of the wheel 1 in connection with a compression movement or decompression movement of the wheel 1 relative to the body 15 of the vehicle. Although the connecting shaft 5 or more specifically its axis of rotation must continue to run more or less in the direction of the transverse direction of the vehicle, but extend in the as-designed position (according to FIG. 1) and viewed in a vertical projection in such a way that the axis of rotation is slightly inclined relative to this transverse axis and/or extend, when viewed in a projection in the direction of the longitudinal axis of the vehicle, so as to be slightly inclined relative to the horizontal plane. In this context is also to be understood the angular deviation (mentioned above several times) from the direction, which extends up to an angle in a range between 6° and 10° relative to an essentially vertical direction, i.e. relative to the plane, in which the control arms 11, 10 can be pivoted, or relative to a direction extending more or less in the longitudinal direction of the vehicle, i.e. relative to the direction of extension of the control arms 11, 10, in a vertical projection from a kinematic perspective.

In order to implement the slight inclination of the connecting shaft 5 relative to the pivot axis 1* of the wheel and, hence, also relative to the rotational axis of the output shaft 8 in any event with the use of the toothed wheels as the gear wheels 3, 4, 6, 7, at least the first gear wheel 6 of the second transmission stage (6-7) is designed as a bevel gear with a small opening angle (angle in the conical tip). (If, instead of the gear wheels in this transmission stage, other gear wheels, for example, gears of an infinitely flexible guide mechanism, were to be provided, then the first gear wheel 6 of the second transmission stage (6-7) is designed as a corresponding bevel gear.)

In the present embodiment the second gear wheel 4 of the first transmission stage (3-4) sits on the connecting shaft 5 just like the first gear wheel 6 of the second transmission stage (6-7); and this second gear wheel is designed as a bevel gear wheel, generally known as a bevel gear, in order to be able to show an orientation of the drive shaft 2 in essentially the transverse direction of the vehicle, but this embodiment is not absolutely mandatory. With the corresponding large inclination of the drive shaft 2 relative to the output shaft 8 the second gear wheel 4 of the first transmission stage (3-4) could also be designed as a simple spur gear despite the use of a simple spur-cut drive pinion as the first gear wheel 3 of the first transmission stage (3-4).

Not shown in FIGS. 1 to 4 is an advantageous further development, according to which the articulated connection between the first control arm 11 and the second control arm 10, i.e. in the area of their mutual pivot axis 13*, which extends through the points B, C (see FIG. 1), is provided with a rotational damper element and/or a corresponding rotational spring element that influences the movements of the wheel 1 relative to the body 15 of the vehicle. These said elements can perform in an especially space-saving way the function of a conventional bearing spring (between the wheel 1 and the body 15 of the vehicle) and/or a vibration damper of a conventional wheel suspension. The advantage of this feature is that in the event of a compression movement or decompression movement of the wheel 1 relative to the body 15 of the vehicle, relatively large pivoting angles or rotational angles of both control arms 11, 10 relative to each other will occur in this pivot axis 13* of the two control arms 11, 10. As an alternative or in addition, however, the articulated attachment of the second control arm 10 at the body 15 of the vehicle, i.e. at point A from FIG. 1, can have a rotational damper element and/or a rotational spring element that influences the movements of the wheel 1 relative to the body 15 of the vehicle. Moreover, the exemplary embodiment, which is explained in detail below, shows such elements.

Referring additionally to the basic design, the articulated connection between the first control arm 11 and the second control arm 10 and/or the articulated connection between the second control arm 10 and the vehicle body 15 (at point A in FIG. 1) can be designed in the form of a rubber mounting, which allows small elastokinematic relative movements, so that it is possible to use in a targeted manner the elastokinematic effects with respect to the driving dynamics and the driving comfort of a motor vehicle provided with such a single wheel suspension or a corresponding rear axle. Furthermore, it has already been mentioned that the linkage of the pendulum support 12 at the first control arm 11 and at the body vehicle 15 is configured preferably in such a way that this pendulum support 12 restricts only one kinematic degree of freedom of the wheel suspension. However, this so-called pendulum support 12 can also be designed in the form of an A-arm having a broadened base at point E from FIG. 1, that is, in the joint region on the vehicle body 15, so that the transverse forces acting on the wheel 1 when the vehicle is moving can be supported not only at point A relative to the vehicle body, but additionally at the said point E.

One exemplary embodiment that is constructed in detail is explained below. In this case the accompanying FIGS. 5 to 7 show this exemplary embodiment in a horizontal sectional view comprising the pivot axis 1* of the wheel. In FIG. 5 the cross-section surfaces of all of the structural elements are marked, whereas in FIG. 6 only the wheel 1 and the two control arms 10, 11, which guide the wheel, together with their connecting element 13 are marked for the sake of a better overview; and in FIG. 7 only the wheel 1 with the elements of the said gear mechanism (3-4-5-6-7) is marked for clarity. For additional information regarding the design of the control arms 10, 11, see the exemplary embodiment described in detail in the international application PCT/EP2010/067478 in conjunction with FIGS. 4 to 7. This exemplary embodiment from the international application has much in common with the present exemplary embodiment. In this context the reference numerals of those structural elements that are not shown in the present drawings of FIGS. 1 to 4 elucidating the underlying principles of the invention and are incorporated from the FIGS. 4 to 7 of the international application PCT/EP2010/067478 in a more or less identical or similar manner, are marked with the reference numerals used in PCT/EP2010/067478, but raised by the value "100" in the present invention. For example, a carrier that is marked with the reference number 9 in the international application PCT/EP2010/067478 and is provided in an identical manner in the present embodiment bears the reference number 109 in the present invention.

At this point reference is made to FIG. 6, which shows very clearly the wheel 1 with its rim 1a and the wheel disk 1b, which is fastened to a driving flange 131 with several screws (not visible in the figure). The driving flange forms a common component with the output shaft 8, which will be explained in detail below in conjunction with FIG. 7. This driving flange 131 is mounted in a rotatable manner on a so-called central mandrel 11c of the first control arm 11 by way of a double row angular contact ball bearing 121, which forms the wheel bearing O in FIGS. 1 to 4. This central mandrel represents practically the so-called wheel carrier and is an essential component of the first control arm 11. In total, this first control arm 11 consists in essence of a basin-shaped control arm part 11a; a cover part 11b, which partially covers this control arm part; the said central mandrel 11c and a continuation 11d, on which the aforementioned pendulum support 12 is supported by means of a bolt 201. The second control arm 10 is also constructed of multiple parts and consists, in particular, of a control arm part 10a and a control arm cover part 10b, which covers a cavity inside this control arm part 10a. The first control arm 11 has a circularly cylindrical recess, which is also formed by the suitably formed central mandrel 11c and the continuation 11d of the first control arm 11. In this recess of the first control arm the second control arm 10 is mounted in a rotatable manner relative to the first control arm 11 by means of two adjacent ball bearings 202. In this case a rotational damper element 135 (not shown in detail) acts as a connecting element 13 (explained in conjunction with the FIGS. 1 to 4) between these two control arms 10, 11; and the pivot axis of this rotational damper element is the pivot axis 13* of the control arm. Furthermore, a sleeve marked with the reference numeral 13 acts as the connecting element 13 in the present embodiment; and this sleeve is pulled onto a section of the housing of the rotational damper element 135.

Whereas the first control arm 11 of the present exemplary embodiment is very different from the first control arm of the exemplary embodiment, explained in the international application PCT/EP2010/067478, especially in the region of the wheel carrier or more specifically the central mandrel 11c, the second control arm 10 of the present exemplary embodiment is designed in a manner that is very similar to the second control arm of the exemplary embodiment included in the said international application. In particular, the pivotable mounting of this second control arm 10 relative to the body of the vehicle is designed in a very similar way, i.e. by a carrier 109 and a carrier shaft 108 by angular contact ball bearings 124, for which reason an in-depth discussion of these features is omitted in the present embodiment. The same also applies to the configuration and arrangement of a rotational spring element 115, which is provided in this embodiment in a manner analogous to the exemplary embodiment, explained in the international application PCT/EP2010/067478. In the present embodiment the rotational spring element is provided and inserted in the form of a helical spring between the second control arm 10 and the vehicle body 15, in order to influence in a desired way the two control arms' 10, 11 possible compression and decompression movements of the wheel 1 (in the vertical direction) relative to the body 15 of the vehicle.

At this point reference is made to FIG. 7, in which the gear mechanism (3-4-5-6-7-8), described in the introductory part as well as in FIG. 4 of the present application, is highlighted. Not shown in FIG. 7 is the said electric motor (M) comprising an output shaft or a motor shaft, which forms the drive shaft 2 or merges into this drive shaft, so that the pivot axis of the drive shaft 2 coincides with the axis 108* of the carrier shaft 108. It is very plain to see that the drive shaft 2 is mounted inside the hollow carrier shaft 108 by needle bearings 203. In the present embodiment the first gear wheel 3 of the first transmission stage (3-4) of the gear mechanism (3-4-5-6-7-8) is formed in one piece on the end of the drive shaft 2 that is located inside the space 9 described by the rim 1a of the wheel 1; and this first gear wheel of the first transmission stage of the gear mechanism meshes with the second gear wheel 4 of this transmission stage (3-4). In the present embodiment the connecting shaft 5, which is designed as a hollow shaft, is formed directly on this second gear wheel 4; and the damper element 135 is located inside this connecting shaft. The connecting shaft 5 is mounted in a rotatable manner by needle bearings 204 in a circularly cylindrical recess in the second control arm 10, so that the rotational axis of the connecting shaft 5 coincides with the pivot axis 13* of the control arm.

The first gear wheel 6 of the second transmission stage (6-7) is suitably fastened on the end of the connecting shaft 5 that faces away from the gear wheel 4 and is mounted in a rotatable manner by a cylindrical roller bearing 205 quasi on the connecting element 13, characterized herein as the sleeve, which is pulled onto a housing section of the rotational damper element 135. This first gear wheel 6 meshes with the second gear wheel 7 of this second transmission stage (6-7); and this second gear wheel is designed as a hollow wheel and is connected to the output shaft 8. This output shaft is also designed as a hollow shaft (and has almost the shape of a cup spring) and passes over (as already mentioned at the beginning of the explanations in conjunction with FIG. 6) quasi into the driving flange 131. It goes without saying that the rotational axis of the second gear wheel 7 and the output shaft 8 coincide with the pivot axis 1* of the wheel 1.

Each of the two transmission stages (3-4) and (6-7) is enveloped by its own housing 10* or 11* respectively, which is more or less closed against the surrounding region, in order to prevent the gear wheels 3, 4, 6, 7 from getting dirty and in order to hold a necessary lubricant at these gear wheels 3, 4, 6, 7 and not to allow this lubricant to escape into the surrounding area. In this case the gear housing 10* of the first transmission stage (3-4) is formed by the second control arm 10 in that the two gear wheels 3, 4 and the associated sections of the shafts 2, 5 are arranged in the aforementioned cavity, which is jacketed by the control arm part 10a and the control arm cover part 10b, with the provision of suitable seals. In a comparable way the gear housing 11* of the second transmission stage (6-7) is formed by the first control arm 11 in that the two gear wheels 6, 7 and the associated sections of the shafts 5, 8 are arranged in the cavity of the basin-shaped control arm part 11a with the provision of suitable seal; and this cavity, which interacts with the aforementioned cover part 11b, which partially covers this basin-shaped control arm part, and the central mandrel 11c as well as the rotational damper element 135 and the second control arm 10, is more or less tightly closed off from the surrounding area.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A single wheel suspension for a non-steerable driven wheel of a two track vehicle, comprising:
   a first control arm and a second control arm which extend essentially in a longitudinal direction of the vehicle, each of the first and second control arms being arranged to pivoted in an essentially vertical plane;
   a wheel bearing arranged to carry the wheel,
   wherein
      the wheel bearing is affixed directly or indirectly to the first control arm,
      the first control arm is supported with its end section on a body of the vehicle by a pendulum support which extends at least approximately in a vertical direction of the vehicle when the vehicle is in a static ride height position,
      the second control arm is supported at a first end in an articulated manner directly or indirectly on the vehicle body with only one kinematic rotational degree of freedom and at a second end is connected in an articulated manner to the first control arm between the wheel bearing and an attachment point of the pendulum support with only one kinematic rotational degree of freedom by a connecting element between the first control arm and the second control arm,
      the first control arm is located with at least its section which extends from the wheel bearing to the connecting element with the second control arm inside a space enclosed by a rim of the wheel, the wheel is arranged to be driven by a drive shaft and a gear mechanism which adjoins said drive shaft and is arranged at least partially inside the space enclosed by the wheel rim, the gear mechanism includes at least a first transmission stage and a second transmission stage which are offset from one another in an axial direction of the wheel, and an axis of rotation of a connecting shaft which connects a second gear wheel of the first transmission stage to a first gear wheel of the second transmission stage coincides with a pivot axis of the connecting element between the first and second control arms.

2. The single wheel suspension as claimed in claim 1, wherein the second control arm is located inside the space enclosed by the wheel rim at least in the static ride height position and at least in a projection in the direction of at least one of a pivot axis of the wheel and the gear mechanism.

3. The single wheel suspension as claimed in claim 2, wherein the pivot axis of the articulated connection between the first control arm and the second control arm is inclined relative to at least one of the horizontal plane and the transverse direction of the vehicle in the static ride height position.

4. The single wheel suspension as claimed in claim 3, wherein at least the first gear wheel of the second transmission stage is a bevel gear wheel.

5. The single wheel suspension as claimed in claim 4, wherein a second gear wheel of the second transmission stage (6-7) has internal teeth.

6. The single wheel suspension as claimed in claim 5, wherein an axis of rotation of the drive shaft coincides with the pivot axis of the second control arm supported in an articulated manner on the vehicle body with only one kinematic rotational degree of freedom.

7. The single wheel suspension as claimed in claim 6, wherein when the pivot axis of one of the two control arms coincides with a rotational axis of at least one of the transmission stages the other of the two control arms is mounted in a rotatable manner on one of the drive shaft, the connecting shaft and a shaft about which the wheel bearing rotates.

8. The single wheel suspension as claimed in claim 1, wherein at a section of at least one of the two control arms is a housing, and two gear wheels of one of the transmission stages are arranged within the housing.

9. The single wheel suspension as claimed in claim 1, wherein the articulated connection between the first control arm and the second control arm includes at least one of a rotational damper element and a rotational spring element which influences the movement of the wheel relative to the vehicle body.

10. The single wheel suspension as claimed in claim 1, wherein the articulated attachment of the second control arm at the vehicle body includes at least one of a rotational damper element and a rotational spring element that influences the movement of the wheel relative to the vehicle body.

* * * * *